United States Patent
Mori et al.

(10) Patent No.: US 6,498,289 B1
(45) Date of Patent: *Dec. 24, 2002

(54) SOLAR BATTERY MODULE AND ROOFING MATERIAL INCORPORATING IT

(75) Inventors: Masahiro Mori, Kyoto (JP); Kimitoshi Fukae, Nara (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,650

(22) Filed: Aug. 1, 1997

(30) Foreign Application Priority Data

Aug. 8, 1996  (JP) ............................. 8-224672

(51) Int. Cl.[7] .................. H01L 31/042; E04D 15/02
(52) U.S. Cl. ................... 136/244; 126/621; 126/623; 52/173.3
(58) Field of Search ................. 136/244, 246, 136/251, 291; 176/623, 621; 52/173.3

(56) References Cited

U.S. PATENT DOCUMENTS

| | | | | |
|---|---|---|---|---|
| 4,315,163 A | * | 2/1982 | Bienville | 307/66 |
| 4,341,607 A | * | 7/1982 | Tison | 204/129 |
| 4,636,577 A | * | 1/1987 | Peterpaul | 136/206 |
| 4,830,038 A | * | 5/1989 | Anderson et al. | 136/251 |
| 5,048,507 A | | 9/1991 | Ridett | 126/430 |
| 5,092,939 A | * | 3/1992 | Nath et al. | 136/251 |
| 5,409,549 A | * | 4/1995 | Mori | 136/244 |
| 5,589,006 A | * | 12/1996 | Itoyama et al. | 136/248 |
| 5,746,839 A | * | 5/1998 | Dinwoodie | 136/246 |

FOREIGN PATENT DOCUMENTS

| | | | | |
|---|---|---|---|---|
| CA | 2136790 | * | 5/1995 | ......... H01L/31/058 |
| CH | 684202 | | 7/1994 | |
| CN | 85 1 01326 | | 1/1987 | |
| CN | 85 1 01373 | | 1/1987 | |
| EP | 0005753 | * | 12/1979 | ............ F24J/3/02 |
| EP | 0 625 802 A2 | * | 11/1994 | ......... H01L/31/042 |
| EP | 0625802 | | 11/1994 | ......... H01L/31/042 |
| FR | 2310539 | * | 4/1976 | ............ F24J/3/00 |
| JP | 5798752 | * | 6/1982 | ............ F24J/3/02 |
| JP | 688645 | * | 3/1994 | ............ F24J/2/04 |
| JP | 7211932 | * | 8/1995 | ......... H01L/31/042 |

* cited by examiner

Primary Examiner—Harold Pyon
Assistant Examiner—Michael C. Miggins
(74) Attorney, Agent, or Firm—Fitzpatrick, Cella, Harper & Scinto

(57) ABSTRACT

A solar battery module is constructed in such a way that a photovoltaic element is fixed on a reinforcing sheet, a plurality of junction boxes for drawing power out of the photovoltaic element to the outside are provided on an anti-light-receiving-surface side of the reinforcing sheet, first spacer members having a height higher than a height of the junction boxes are placed along two opposite sides of the reinforcing sheet, and a second spacer member is placed between the plurality of junction boxes. When it is applied to a roof, the first spacer members are fixed on a roof substrate material, a space defined between the roofing material and the roof substrate material is open to the outside air, and the space is in communication with the inside of a house at the ridge. The above structure simplifies works for securing combination solar battery and roofing materials with forming a draft layer onto the roof. In addition, when stress is exerted on the central portion of panel, the above structure prevents the panel from being deformed and prevents the junction boxes from being broken.

15 Claims, 9 Drawing Sheets

SOLAR BATTERY MODULE AND ROOFING MATERIAL INCORPORATING IT

BACKGROUND OF THE INVENTION

1. Field of the Invention

The present invention relates to a solar battery module and more particularly, to a solar battery roof and a mounting method thereof realizing simplification of installing and securing methods.

2. Related Background Art

Solar batteries have popularly been used heretofore as clean and non-exhaustive energy supply sources and various research and development has been conducted on the solar cells or batteries themselves. Further, development is active on solar battery modules well suited to installation at a variety of places, for example, on the ground and on the roof.

Especially, in terms of installation on the roof, development of combination roofing material and solar battery module, which can also function as a roofing material, is useful also in respect of reduction of cost for spread of solar battery in the future.

An example of the solar battery module suited to the existing roof construction methods is the solar battery module shown in FIG. 8 and FIG. 9, which is described in Japanese Laid-open Patent Application No. 7-211932. FIG. 8 is a cross-sectional view obtained when the central part of the solar battery module is cut vertically in the direction from the ridge to the eaves and FIG. 9 is a cross-sectional view obtained when an edge part of the solar battery module is cut laterally in the direction perpendicular to the foregoing direction. This example is characterized in that air flow path 8 is formed between sheathing roof board 7 and solar battery module 13 and in that heat of the solar battery module heated to high temperatures is conducted to the air flowing in this flow path 8 to heat it up and it is utilized for heating of building.

In FIG. 8 and FIG. 9, junction boxes 10 are provided on the opposite surface (which will be referred to as a back surface) to the light receiving surface of the solar battery module 13, electric output line 11 is drawn out of each junction box 10, and connector 12 is attached to the end thereof to be electrically connected to an adjacent solar battery module.

An example of the solar battery module 13 is fabricated in such a way that an amorphous silicon solar battery is formed on a stainless steel substrate, a translucent resin film is put on the light receiving surface side, a metal reinforcing sheet is put on the back surface side, and the laminate is resin-sealed with a translucent resin. This solar battery module 13 is bent by folding together with the translucent resin film, translucent resin, and metal reinforcing sheet, thereby being formed in a shape suitable for the batten-seam roof structure as shown in FIG. 9, which is one of the conventional roof construction methods.

The installation and securing sequence is as follows. For forming the space 8 between the sheathing roof board 7 and the solar battery module 13, spacer members 14a, 14b are fixed by unillustrated nails to the sheathing roof board 7, then the solar battery module 13 is mounted thereon, and retaining clip 15 is fixed by drill screw 16, thereby installing and securing the solar battery module 13. At this time, the distance between the spacer members 14a is 455 mm in the case of the conventional shaku (unit of length) construction method or 500 mm in the case of the meter construction method. Reference numeral 17 designates the batten, which functions as a flashing.

When exposed to the sunlight, the solar battery module 13 is heated to high temperatures, approximately 80° C. The air flows in the flow path of the space 8 on the back surface side of the solar battery module 13 and the air rises up to the ridge as being heated by heat conduction from the solar battery module 13 and is taken into the room to be used for heating.

In the above conventional technology, the spacer members 14a and 14b must be installed and fixed at accurate positions relative to the solar battery module 13. Namely, as shown in FIG. 9, the spacer members must be installed and fixed so as to accurately support the both edge portions of the solar battery module 13 having the width of about 455 mm to 500 mm. It is, however, very troublesome to carry out the installing and fixing works of the spacer members 14a and 14b at the accurate positions in the working site on the roof of poor foothold.

SUMMARY OF THE INVENTION

Means for solving the above problem is achieved by a solar battery module wherein a photovoltaic element is fixed on a reinforcing sheet, a plurality of junction boxes are provided for drawing power out of the photovoltaic element to the outside, first spacer members higher than the junction boxes are placed along two opposite sides of the reinforcing sheet, and a second spacer member is placed between the plurality of junction boxes.

When the solar battery module is applied to the roof, the roof is so constructed that the first spacer members are fixed on a roof substrate material, the space defined between the roofing material and the roof substrate material is open to the outside air at the eaves, and the space is in communication with the inside of house at the ridge.

DESCRIPTION OF THE PREFERRED EMBODIMENTS

An embodiment of the present invention will be described referring to FIG. 1 to FIG. 3.

Figure 1:
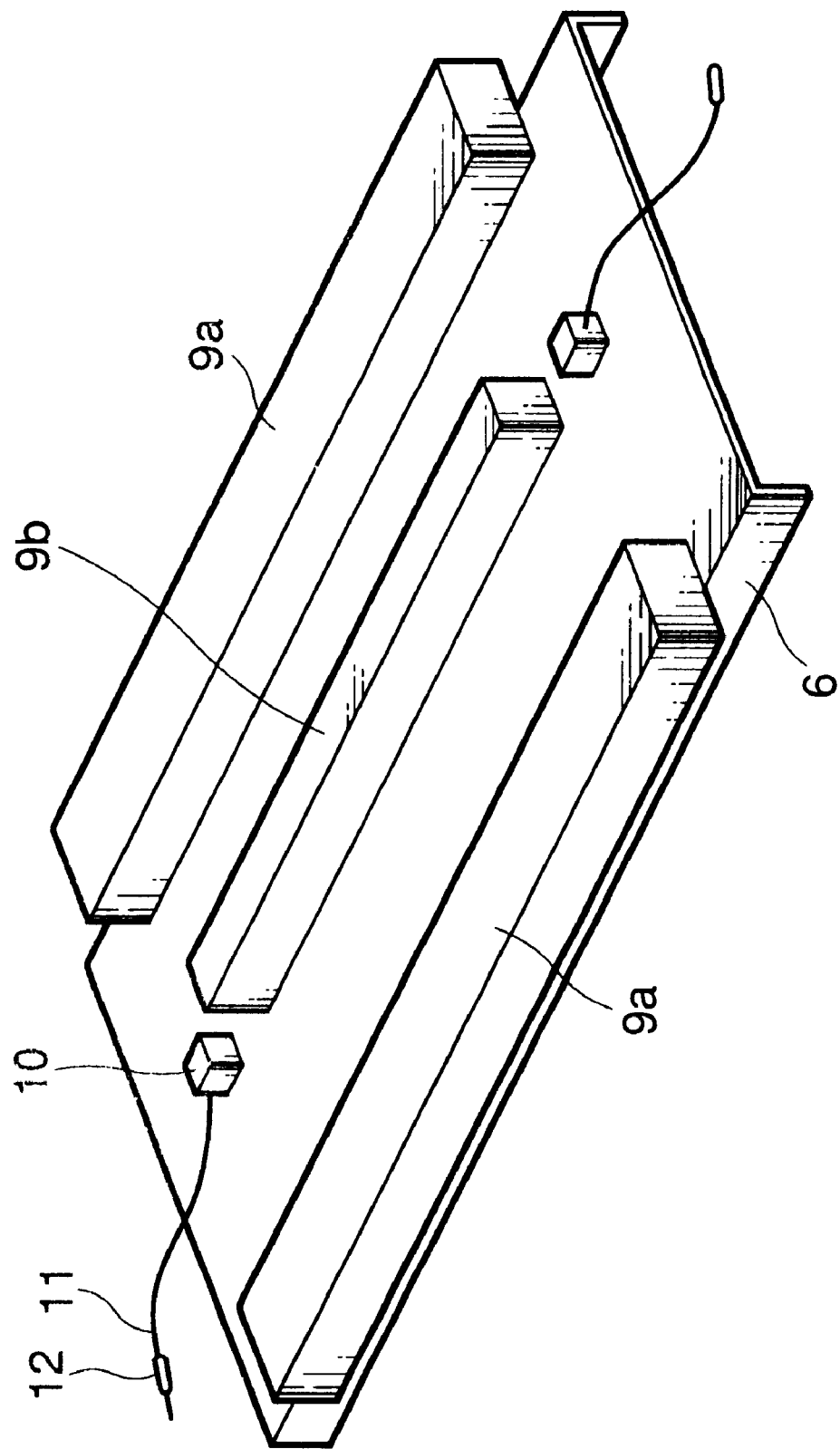
FIG. 1 is a perspective view of the back surface side to show an example of the solar battery module of the present invention.
Figure 2:
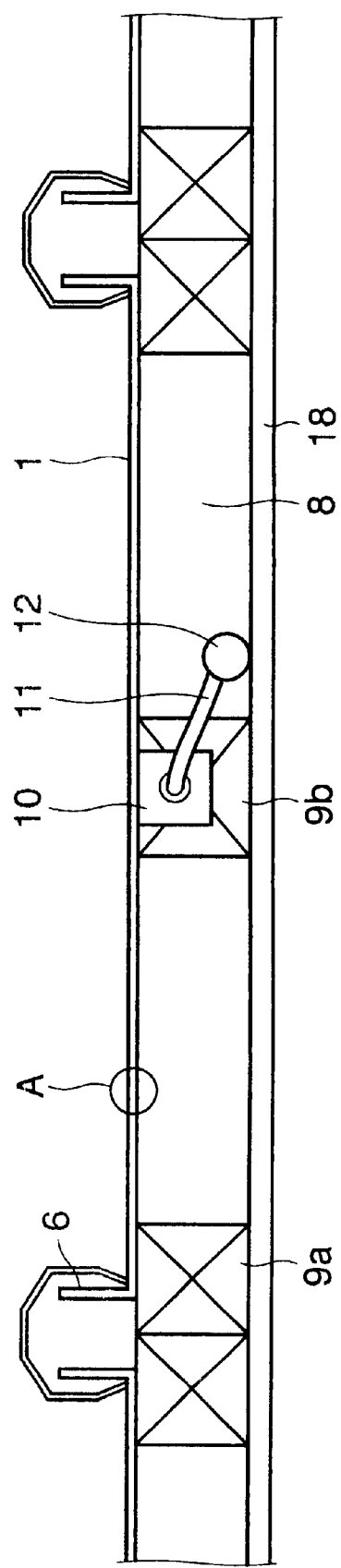
FIG. 2 is a cross-sectional view to show an example of the installed state of the solar battery module of the present invention.
Figure 3:
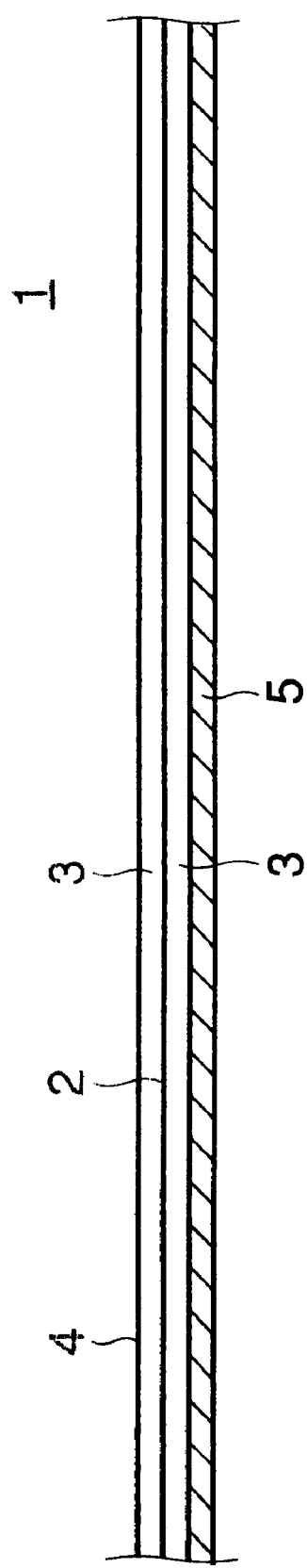
FIG. 3 is a partly enlarged view of part A of FIG. 2.

FIG. 1 is a perspective view of the back surface side, i.e., the opposite side to the light receiving surface, to show an example of the solar battery module according to the present invention, FIG. 2 is a cross-sectional view to show the installed and secured state of the solar battery module, and FIG. 3 is a partly enlarged, cross-sectional view of part A of FIG. 2.

(Structure of Solar Battery Panel 1)

First, the structure of the solar battery panel 1 will be described referring to FIG. 3.

The solar battery panel 1 includes the photovoltaic element 2 resin-sealed with the translucent resin 3 and has the translucent resin film 4 on the light receiving surface and the metal reinforcing sheet 5 on the back surface side, which are stacked by bonding.

Here, an example of the method for bonding these in stack is a method for stacking the sheet translucent resin 3, photovoltaic element 2, sheet translucent resin 3, and translucent resin film 4 in order on the metal reinforcing sheet 5 and fusing the sheet translucent resin sheets 3 with degassing under pressure.

The solar battery module of the present embodiment will be described with reference to FIG. 1 and FIG. 2.

The solar battery panel 1 fabricated as described above is bent by folding to form flanges 6.

Then the spacer members 9a, 9b are fixed to the metal reinforcing sheet 5 of the solar battery panel 1 by adhesive, screws, nails, or the like, for forming a draft layer 8 between the solar battery panel 1 and the roof substrate material on which the solar battery panel 1 is to be installed. The spacer members 9a are fixed to the roof substrate material 18 of sheathing roof board and the like by unillustrated nails as shown in FIG. 2, thereby installing and securing the solar battery module with forming the space 8.

At this time, electrical connection between solar battery modules is made by connecting connectors 12, each provided at the end of output line 11 led out of the junction box 10 provided on the back surface side of the solar battery panel 1, between adjacent solar battery modules.

(Application to Heating System)

Figure 7:
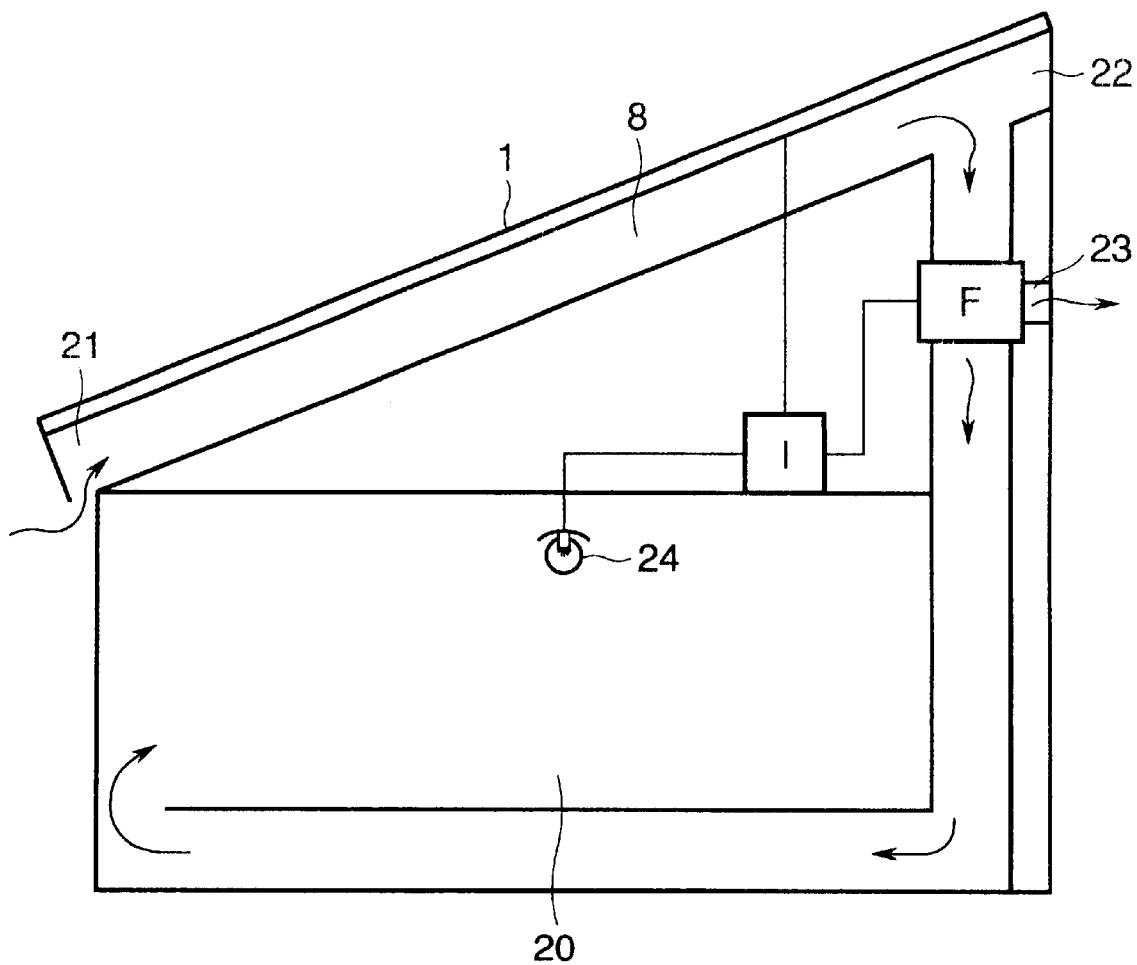
FIG. 7 is an example of the roof according to the present invention.
Figure 8:
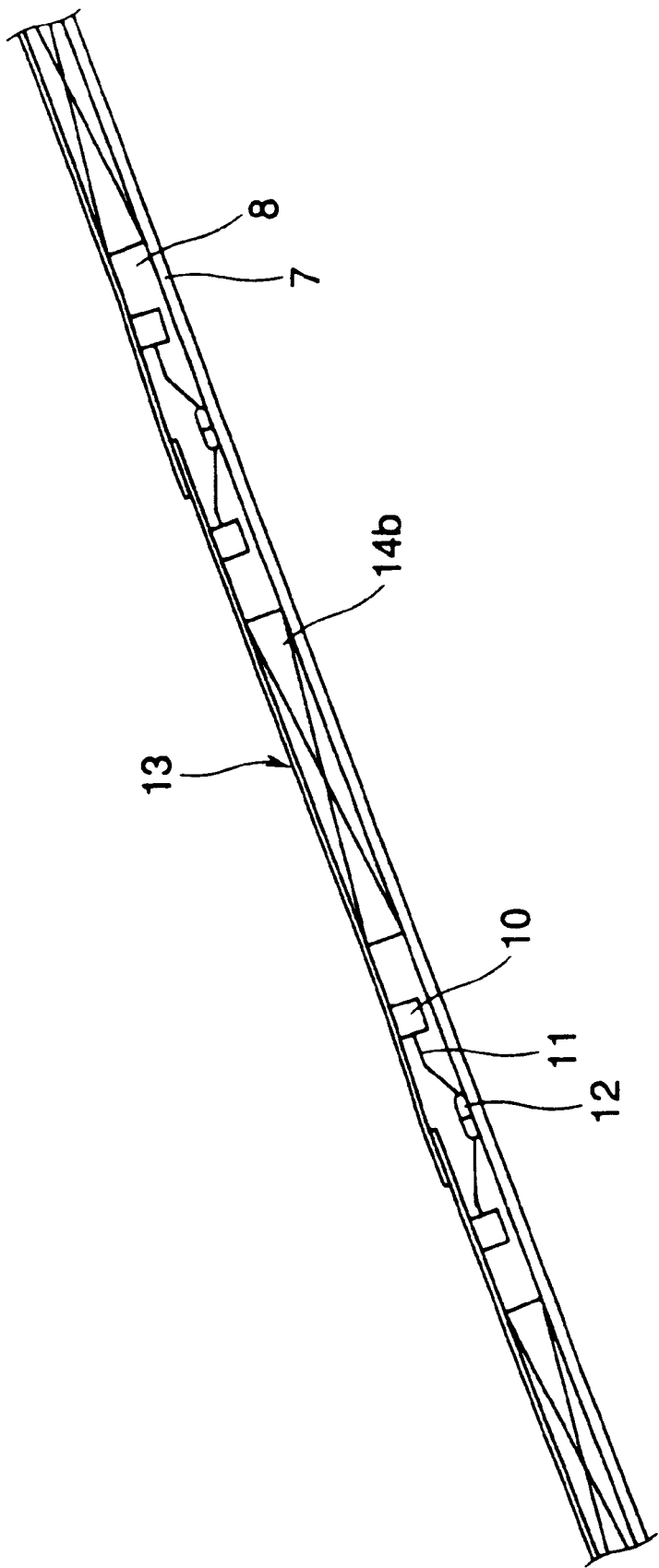
FIG. 8 is a cross-sectional view to show the installed state of the conventional solar battery module.
Figure 9:
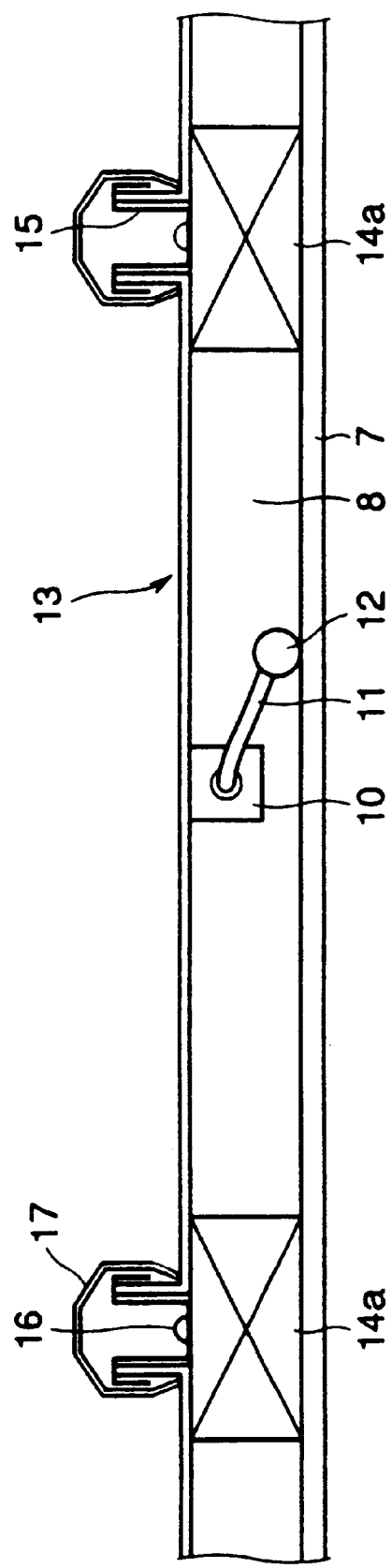
FIG. 9 is a cross-sectional view to show the installed state of the conventional solar battery module.

FIG. 7 is an example in which the roofing material of the present invention is applied to a heating system for home. Arrows indicate the flow of air. In the cold season, the air taken through the eaves 21 flows through the draft layer 8 to be heated by thermal conduction from the solar battery panels 1 and the heated air is taken into the room 20 via the ridge 22 to be used for heating. A heat accumulating device may be provided below the floor. For forcing the air to circulate, a fan F is provided midway of the air flow passage. In the hot season the air taken through the eaves 21 is discharged from exhaust port 23 to the outside to enhance the heat insulating function of the roof, thereby keeping the environment in the room 20 comfortable.

The solar battery panel 1 is used together with an inverter I, thus composing a solar electric power generation system. The power converted by the inverter I is supplied to the fan F and to the other loads 24 in the home.

As described above, since in the present invention the spacer members 9a, 9b are preliminarily mounted on the solar battery panel 1, the invention obviates the need for the cumbersome works for installing and securing the spacer members at the accurate positions on the roof substrate material in correspondence to the installing and securing sites of solar battery module as conducted before, thus greatly improving workability at the construction site. Consequently, it can decrease the construction period and also decrease the construction costs.

Since installation and fixation of solar battery module can be realized by fixing the spacer members 9a, 9b to the roof substrate material 18, the retaining clips used before become unnecessary.

Further, in the case wherein the junction boxes for outlet of electrode terminal, or the electric output lines are provided on the back surface side opposite to the light receiving surface, the structural strength of solar battery module can be increased in portions near the places where the junction boxes are mounted. By employing this structure, even if a load is exerted on the solar battery module after the installation and fixation of solar batter module, the solar battery module will be prevented from being curved in the portions near the places where the junction boxes are mounted, which prevents the junction boxes from being broken and which suppresses occurrence of dissociation at the bonding interface to the metal reinforcing sheet.

Next, the constituent elements will be described.

(Solar Battery Panel 1)

There are no specific limitations on the solar battery panel, but a solar battery panel suitably used as a combination roofing material and solar battery module is the one as described above wherein the translucent resin film 4 is provided on the light receiving surface, the photovoltaic element 2 is resin-sealed by the translucent resin 3, and the panel, together with the metal reinforcing sheet 5, can be bent by folding.

(Photovoltaic Element 2)

There are no specific limitations on the photovoltaic element, and examples of the photovoltaic element include monocrystal silicon photovoltaic elements and non-monocrystal photovoltaic elements, specifically, polycrystal silicon photovoltaic elements, amorphous silicon photovoltaic elements, copper indium selenide photovoltaic elements, compound semiconductor photovoltaic elements, and so on. Preferably, the photovoltaic element 2 is selected from the non-monocrystal photovoltaic elements. A more preferred photovoltaic element is a photovoltaic element having flexibility and an especially preferred photovoltaic element is an amorphous silicon photovoltaic element formed on a stainless steel substrate.

With use of the photovoltaic element having flexibility, even if a worker steps on the solar battery module during the installation work or the like on the roof, the photovoltaic element will be prevented from being broken, and thus, it is very suitable for the combination roofing material and solar battery module. Since amorphous silicon shows less reduction in conversion efficiency due to heat than single silicon crystals, it is suitably applicable to the combination roofing material and solar battery. In addition, amorphous silicon can be expected to show the effect to recover optical degradation by annealing.

(Translucent Resin 3)

The translucent resin is used for sealing or bonding of the photovoltaic element 2. Specific examples of the translucent resin include ethylene-vinyl acetate copolymer (EVA), polyvinyl butyral, and silicone resin, but it is not limited to these.

(Translucent Resin Film 4)

The translucent resin film is preferably one having high weatherability, and a suitable example is a fluorocarbon resin film.

Further, in order to avoid breakage and cracks from occurring in the film because of elongation of film during folding and formation of roughness in the light receiving surface, a preferred film is one having an elongation factor of film not less than 250%. If below 250%, there is a possibility that cracks appear during folding of the solar battery panel 1.

(Metal Reinforcing Sheet 5)

A preferred example of the metal reinforcing sheet is one excellent in weatherability, corrosion resistance, and foldability. Examples of such reinforcing sheet include galvanized sheet iron, steel sheets coated with a weather-resistant substance such as fluorocarbon resin or vinyl chloride, stainless steel sheets, and so on.

(Spacer Members 9)

The spacer members 9a, 9b are members for forming the draft layer 8. They are required to have the ability of sufficiently reinforcing the structural strength of solar battery panel 1 and to have a sufficient height for protecting the junction boxes 10. Provision of the spacer member 9b prevents the panel from being deformed when stress is imparted on the central portion of panel. This improves workability during installation of the panel on the roof.

The material for the spacer members is preferably one having the heat resistance to the temperatures of about 80° C., considering that the solar battery panel 1 is heated up to the temperatures of about 80° C., and good processability, high corrosion resistance, and so on. Examples of the material include metals, timber, and resins having such heat resistance.

There are no specific limitations on the shape of the spacer members, and they may be formed in any shape as long as they can exhibit the aforementioned functions. For example, they may be of a rod shape, a block shape of a rectangular parallelepiped or the like, or may be elongate members a cross section of which is a shape of H or I.

A plurality of spacer members 9b may be provided in the central portion, but they must be installed so as not to impede ventilation of air in the draft layer 8. Therefore, a spacer member is preferably positioned in a rod shape on a straight line connecting the two terminal boxes 10, as shown in FIG. 1.

The spacer member 9b is formed preferably in a shape that can house at least one of junction boxes 10 and electric output lines 11. It is also permissible to properly bend the reinforcing sheet 5 by folding into a shape also serving as spacer members.

The spacer member may be provided with electric output line engaging portions that can be engaged with the electric output lines.

EXAMPLES

The present invention will be described further with examples, but it is noted that the present invention is by no means intended to be limited to these examples.

Example 1

Figure 4:
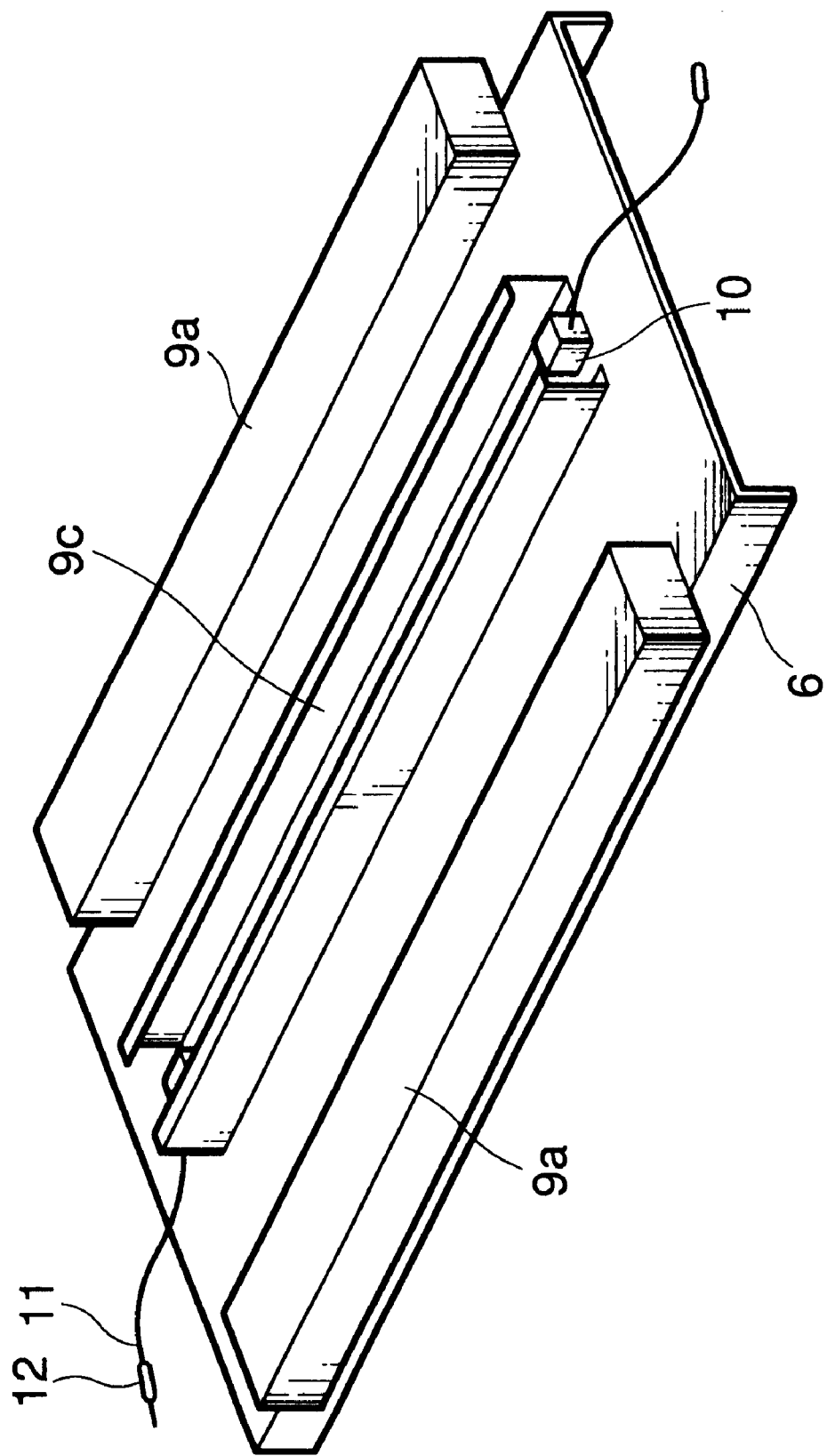
FIG. 4 is a perspective view of the back surface side of the solar battery module of Example 1.

The solar battery module of the present example is characterized in that the junction boxes 10 provided on the back surface side are housed inside the spacer member 9c as shown in FIG. 4, and it is fabricated in the same manner as the aforementioned embodiment except for the points stated specifically herein.

The photovoltaic element 2 was an amorphous silicon photovoltaic element having a stainless steel substrate 125 $\mu$m thick, the translucent resin film 4 was an unoriented type fluorocarbon resin film ("TEFZEL" available from du Pont) 50 $\mu$m thick, the translucent resin 3 was EVA (which was formed in the thickness of 900 $\mu$m on each of the front and back surfaces of the photovoltaic element 2), and the metal reinforcing sheet 5 was a galvanized iron sheet ("Taima color GL" available from Daido Kohan Kabushiki Kaisha) 0.4 mm thick. They were stacked in order and EVA was fused at 150° C. with degassing under pressure to bond them in stack, thus fabricating the solar battery panel 1.

The metal reinforcing sheet 5 was preliminarily perforated in the portions corresponding to the terminal outlet positions, through which the outlet terminals of the positive pole and negative pole were taken out. The junction boxes 10 of polycarbonate were provided for protection and waterproof in the terminal outlet portions and the electric output lines 11 with the connector 12 at the tip were guided out of the junction boxes.

The flange portions 6 were formed by such folding that the inner radius of curvature became 2 mm, by use of a normal "folding machine for steel sheet". The spacer members 9a were made of a timber material and the spacer member 9c was made by bending galvanized sheet iron 1.2 mm thick in a U-shaped cross section. This spacer member 9c was mounted so as to receive the junction boxes 10 inside thereof. The spacer member 9c was bonded and fixed to the metal reinforcing sheet 5 with a silicone based adhesive.

In the present embodiment, since the junction boxes 10 are housed inside of the spacer member 9c, even if the load is exerted on the portions where the junction boxes 10 exist, curvature of solar battery module will be small, which can prevent breakage of junction boxes 10, dissociation of bonding at the bonding interface between the junction boxes 10 and the metal reinforcing sheet 5, and so on.

Example 2

The solar battery module of the present example is characterized in that the spacer member has electric output line engaging portions. The solar battery module of the present example was fabricated in the same manner as in Example 1 except for the points described specifically herein.

Figure 5:
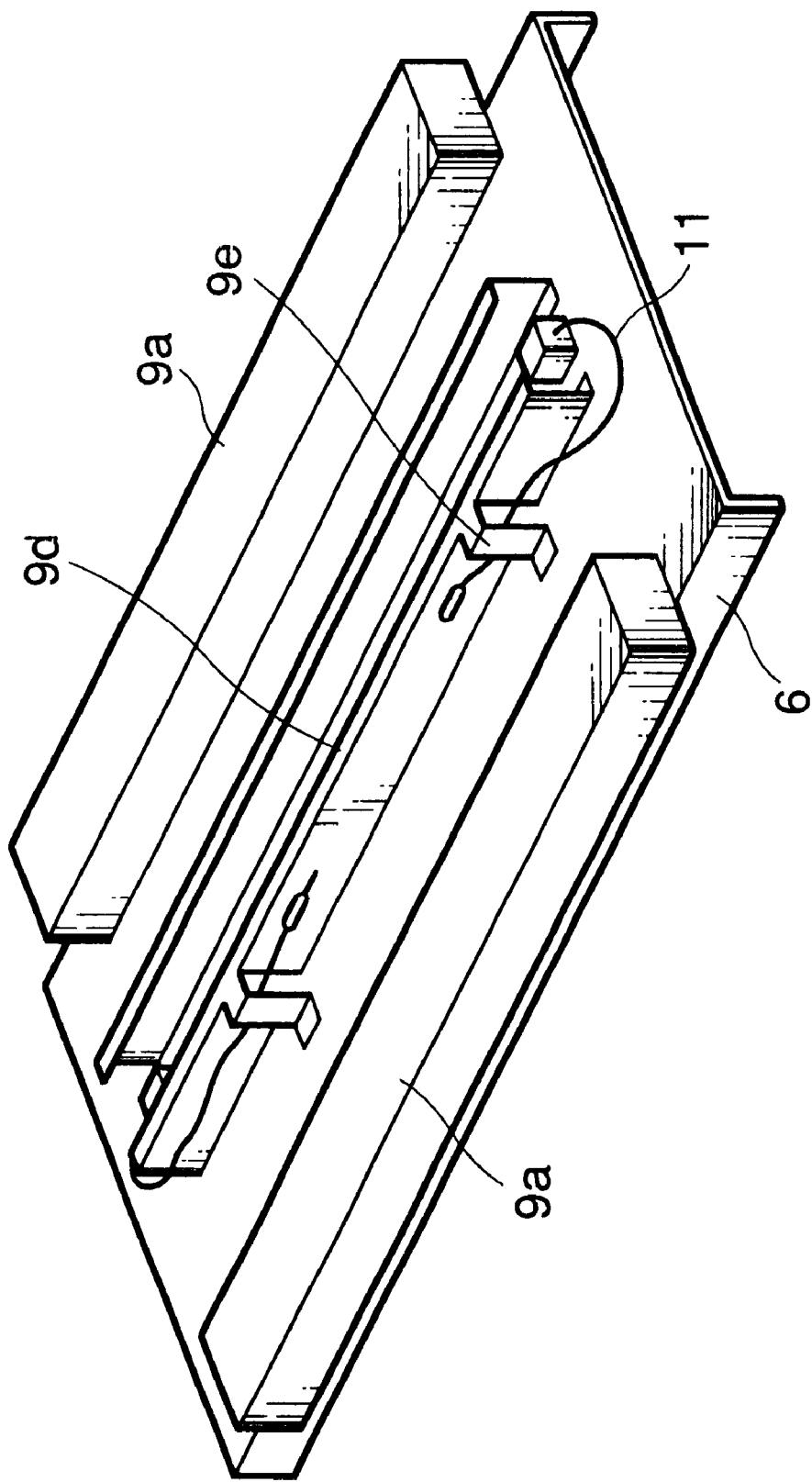
FIG. 5 is a perspective view of the back surface side of the solar battery module of Example 2.

FIG. 5 is a perspective view of the back surface side of the solar battery module of the present example. The spacer member 9d of the solar battery module of the present embodiment has engaging portions 9e with which the electric output lines 11 can be engaged.

In the present example, since the electric output lines 11 are engaged with the spacer member 9d, it can avoid a problem that the electric output lines 11 are suspended to catch another article, for example, during carriage of the solar battery module at the installing and securing site, it can demonstrate very good handlability, and it can improve workability extremely.

Example 3

Figure 6:
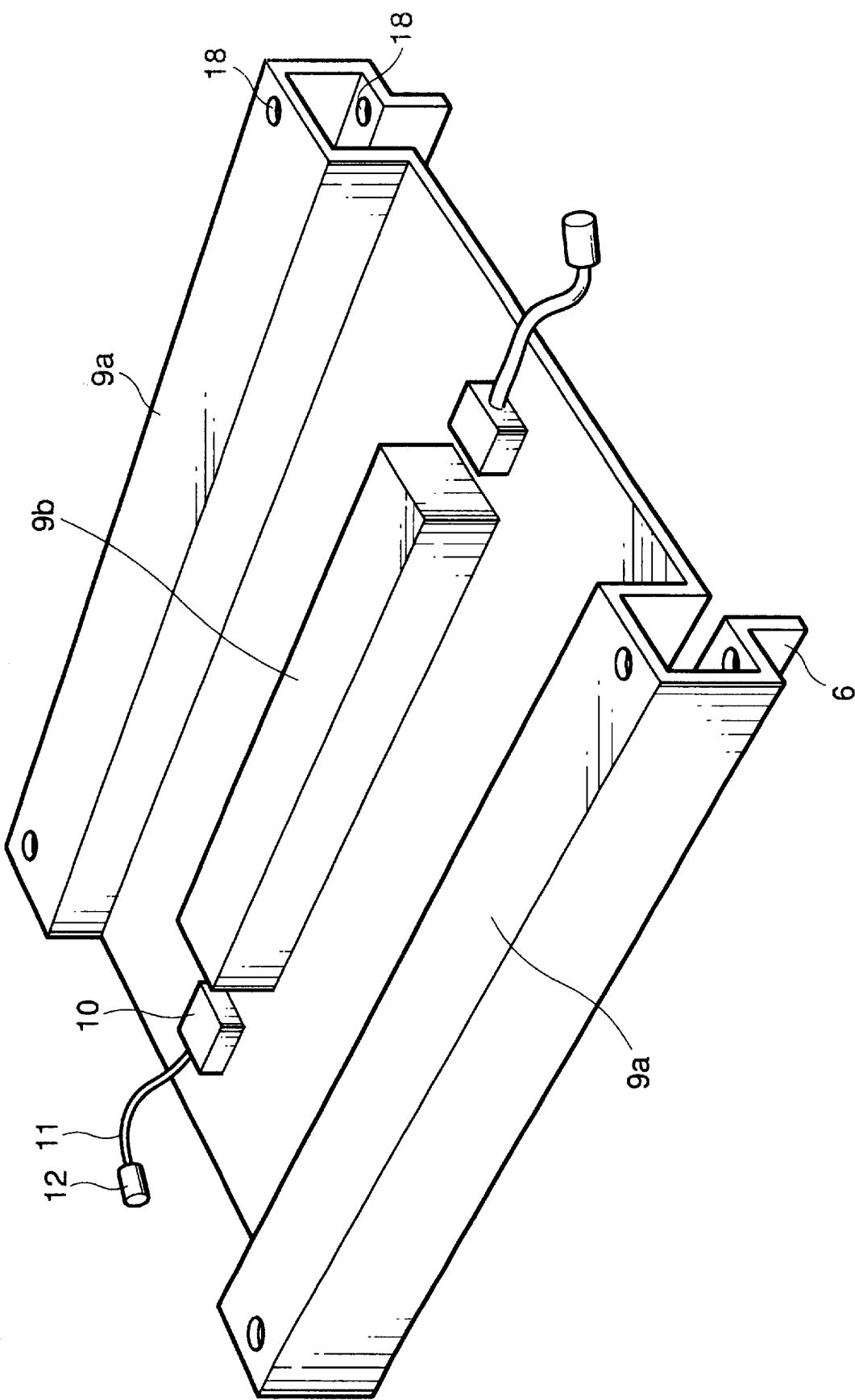
FIG. 6 is a perspective view of the back surface side of the solar battery module of Example 3.

The solar battery module of FIG. 6 is an example in which the reinforcing sheet 5 is formed in such integral structure as to also serve as the spacer members without use of separate members as spacer members. The reinforcing sheet 5 is bent by folding to form the spacer members 9a and flange portions 6. Each spacer member 9a is provided with through holes 18 through which nails are inserted for fixing the module body to the roof substrate material. The solar battery module of the present example can be fabricated in the same manner as in Example 1 except for the above point.

In the present example, since the spacer members 9a also serving as the portions for fixing the module body are formed integrally, reliability can be enhanced of fixation of the module onto the roof substrate material.

What is claimed is:

1. A solar battery module wherein a photovoltaic element is fixed on a reinforcing sheet, a plurality of junction boxes for drawing power out of said photovoltaic element to the outside are provided on an anti-light-receiving-surface side of the reinforcing sheet, first spacer members having a height higher than a height of the junction boxes are placed along two opposite sides of the reinforcing sheet on an anti-light-receiving-surface side of the renforcing sheet, and a second spacer member is placed between said plurality of junction boxes and between said first spacer members on an anti-light-receiving-surface side of the reinforcing sheet.

2. A solar battery module according to claim 1, wherein said junction boxes are placed in a space defined by said second spacer member.

3. A solar battery module according to claim 1, wherein an output line is connected to each said junction box and said second spacer member has an engaging portion for engaging with a part of said output line.

4. A solar battery module according to claim 1, wherein said first spacer members are formed by folding of said reinforcing sheet.

5. A roofing material wherein a photovoltaic element is fixed on a reinforcing sheet, a plurality of junction boxes for drawing power out of said photovoltaic element to the outside are provided on an anti-light-receiving-surface side of the reinforcing sheet, first spacer members having a height higher than a height of the junction boxes are placed along two opposite sides of the reinforcing sheet on an anti-light-surface side of the reinforcing sheet, and a second spacer member is placed between said plurality of junction boxes and between said first spacer members on an anti-light-receiving-surface side of the reinforcing sheet.

6. A roofing material according to claim 5, wherein said junction boxes are placed in a space defined by said second spacer member.

7. A roofing material according to claim 5, wherein an output line is connected to each said junction box and said second spacer member has an engaging portion for engaging with a part of said output line.

8. A roofing material according to claim 5, wherein said first spacer members are formed by folding of said reinforcing sheet.

9. A mounting method of a roofing material wherein a photovoltaic element is fixed on a reinforcing sheet, a plurality of junction boxes for drawing power out of said photovoltaic element to the outside are provided on an anti-light-receiving-surface side of the reinforcing sheet, first spacer members having a height higher than a height of the junction boxes are placed along two opposite sides of the reinforcing sheet on an anti-light-receiving-surface side of the reinforcing sheet, and a second spacer member is placed between said plurality of junction boxes and between said first spacer members on an anti-light-receiving-surface side of the reinforcing sheet;

wherein said first spacer members of said roofing material are fixed on a roof substrate material.

10. A mounting method of roofing material according to claim 9, wherein the two opposite sides of said reinforcing sheet are bent, said first spacer members are provided along the two bent sides, and said first spacer members project out from edge faces of said reinforcing sheet, said first spacer members being fixed on the roof substrate material in portions thus projecting out.

11. A mounting method of roofing material according to claim 9, wherein a plurality of roofing materials are fixed with non-bent sides thereof being in contact, said mounting method comprising a step of electrically connecting said roofing materials with each other.

12. A mounting method of roofing material according to claim 9, wherein said roofing material is placed so that the outside air is guided into a space defined between said roofing material and said roof substrate material and that the air having passed through the space is introduced into the inside of a house.

13. A mounting method of a roofing material wherein a photovoltaic element is fixed on a reinforcing sheet, two opposite sides of said reinforcing sheet are bent, a plurality of junction boxes for drawing power out of said photovoltaic element to the outside are provided on an anti-light-receiving-surface side of the reinforcing sheet, first spacer members having a height higher than a height of the junction boxes are placed along the two bent sides of said reinforcing sheet on an anti-light-receiving-surface side of the reinforcing sheet, and a second spacer member is placed between said plurality of junction boxes and between said first spacer members on an anti-light-receiving-surface side of the reinforcing sheet;

wherein said first spacer members of a plurality of adjacent roofing materials are fixed adjacent to each other on a roof substrate material and a batten is placed so as to cover bent portions of said adjacent reinforcing sheets.

14. A fabrication process of roofing material comprising a step of securing to a reinforcing sheet of a solar battery module, said solar battery module having a photovoltaic element fixed on the reinforcing sheet and having junction boxes for drawing power out of said photovoltaic element to the outside on an anti-light-receiving-surface side of the reinforcing sheet, first spacer members having a height higher than a height of said junction boxes along two opposite sides of said reinforcing sheet on an anti-light-receiving-surface side of the reinforcing sheet, and a step of placing a second spacer member between said plurality of junction boxes and between said first spacer members on an anti-light-receiving-surface side of the reinforcing sheet.

15. A fabrication process of roofing material according to claim 14, further comprising a step of folding said reinforcing sheet.

* * * * *

UNITED STATES PATENT AND TRADEMARK OFFICE
CERTIFICATE OF CORRECTION

PATENT NO. : 6,498,289 B1  
DATED : December 24, 2002  
INVENTOR(S) : Masahiro Mori et al.

It is certified that error appears in the above-identified patent and that said Letters Patent is hereby corrected as shown below:

Column 6,  
Line 66, "reniforcing" should read -- reinforcing --.

Column 7,  
Line 20, "anti-light-surface" should read -- anti-light-receiving-surface --.

Signed and Sealed this

Eighth Day of July, 2003

JAMES E. ROGAN  
*Director of the United States Patent and Trademark Office*